US011508027B2

(12) United States Patent
Nielsen

(10) Patent No.: US 11,508,027 B2
(45) Date of Patent: *Nov. 22, 2022

(54) METHODS AND APPARATUS TO PERFORM SYMBOL-BASED WATERMARK DETECTION

(71) Applicant: The Nielsen Company (US), LLC, New York, NY (US)

(72) Inventor: Christen V. Nielsen, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/067,450

(22) Filed: Oct. 9, 2020

(65) Prior Publication Data
US 2021/0201432 A1 Jul. 1, 2021

Related U.S. Application Data

(63) Continuation of application No. 16/050,738, filed on Jul. 31, 2018, now Pat. No. 10,803,545, which is a
(Continued)

(51) Int. Cl.
G06K 9/00 (2022.01)
G06T 1/00 (2006.01)
(Continued)

(52) U.S. Cl.
CPC ....... *G06T 1/0085* (2013.01); *G06Q 30/0201* (2013.01); *G10L 19/018* (2013.01);
(Continued)

(58) Field of Classification Search
CPC .................................................. G06T 1/0085
See application file for complete search history.

(56) References Cited

U.S. PATENT DOCUMENTS 5,355,161 A 10/1994 Bird et al.
6,909,784 B1* 6/2005 Sugahara ............... H04N 19/61
375/E7.181

(Continued)

OTHER PUBLICATIONS

Jidong Zhong. "Watermark Embedding and Detection" publisher, vol. 1. May 2007 (Year: 2007).*
(Continued)

*Primary Examiner* — Oneal R Mistry
(74) *Attorney, Agent, or Firm* — Hanley, Flight & Zimmerman, LLC

(57) ABSTRACT

An example symbol-based watermark detection method disclosed herein includes, in response to a comparison of a first count of occurrences of a first potential symbol value corresponding to a first symbol within a watermark and a second count of occurrences of a second potential symbol value corresponding to the first symbol, (i) determining a first accumulated signal to noise ratio value corresponding to the occurrences of the first potential symbol value, (ii) determining a second accumulated signal to noise ratio value corresponding to the occurrences of the second potential symbol value, and (iii) selecting one of the first or the second potential symbol value having a greatest accumulated signal to noise ratio value as a likely symbol value for the first symbol. The example method also includes concatenating the likely symbol value with other likely symbol values corresponding to other symbols of the watermark to detect the watermark.

20 Claims, 11 Drawing Sheets

Related U.S. Application Data continuation of application No. 15/192,676, filed on Jun. 24, 2016, now Pat. No. 10,062,134.

(51) Int. Cl.
*G06Q 30/02* (2012.01)
*G10L 19/018* (2013.01)

(52) U.S. Cl.
CPC ............... *G06T 2201/0051* (2013.01); *G06T 2201/0065* (2013.01)

(56) References Cited

U.S. PATENT DOCUMENTS

| | | | |
|---|---|---|---|
| 9,037,453 B2 | 5/2015 | Grill et al. | |
| 9,368,123 B2 | 6/2016 | Srinivasan et al. | |
| 10,062,134 B2 | 8/2018 | Nielsen | |
| 10,803,545 B2 | 10/2020 | Nielsen | |
| 2004/0125125 A1* | 7/2004 | Levy | H04N 21/8355 715/716 |
| 2008/0285796 A1* | 11/2008 | Wendt | H04N 1/32149 382/100 |
| 2009/0136083 A1* | 5/2009 | Picard | H04N 19/467 382/100 |
| 2009/0196500 A1* | 8/2009 | Shi | G06T 1/0028 382/168 |
| 2010/0106510 A1 | 4/2010 | Topchy et al. | |
| 2011/0144998 A1 | 6/2011 | Grill et al. | |
| 2011/0164784 A1* | 7/2011 | Grill | H04N 21/44008 382/100 |
| 2012/0027207 A1* | 2/2012 | Lee | G06T 1/0064 380/205 |
| 2012/0203363 A1 | 8/2012 | McKenna et al. | |
| 2013/0138231 A1 | 5/2013 | McKenna et al. | |
| 2013/0227295 A1* | 8/2013 | Wabnik | H04L 63/00 713/176 |
| 2014/0180675 A1 | 6/2014 | Neuhauser et al. | |
| 2016/0055607 A1* | 2/2016 | Petrovic | G06T 1/0028 382/100 |
| 2017/0024840 A1* | 1/2017 | Holub | G06T 1/0028 |
| 2017/0308528 A1* | 10/2017 | Wade | G06F 16/93 |
| 2018/0018748 A1* | 1/2018 | Petrovic | G06T 1/0028 |

OTHER PUBLICATIONS

Zhong, Jidong, "Watermark Embedding and Detection", Shanghai Jiaotong University, published May 2007, vol. 1, 157 pages.

United States Patent and Trademark Office, "Notice of Allowance and Fee(s) Due", issued in connection with U.S. Appl. No. 15/192,676, dated Apr. 10, 2018, 11 pages.

United States Patent and Trademark Office, "Non-Final Office Action", issued in connection with U.S. Appl. No. 16/050,738, dated Jan. 8, 2020, 9 pages.

United States Patent and Trademark Office, "Notice of Allowance and Fee(s) Due," issued in connection with U.S. Appl. No. 16/050,738, dated Jun. 10, 2020, 8 pages.

* cited by examiner

| 800 | | SYMBOL 1 810 | SYMBOL 2 820 | SYMBOL 3 830 | SYMBOL 4 840 | SYMBOL 5 850 | SYMBOL 6 860 | SYMBOL 7 870 |
|---|---|---|---|---|---|---|---|---|
| 801 | BUFFER POS. 1 | "0x08" 15 dB | "0x6D" 11 dB | "0x45" 6 dB | "0x2E" 15 dB | "0x03" 12 dB | "0x12" 22 dB | "0x01" 12 dB |
| 802 | BUFFER POS. 2 | "0x08" 8 dB | "0x5D" 6 dB | "0x45" 10 dB | "0x2F" 7 dB | "0x03" 7 dB | "0x11" 9 dB | "0x03" 9 dB |
| 803 | BUFFER POS. 3 | "0x08" 8 dB | "0x6D" 13 dB | "0x46" 23 dB | "0x2E" 7 dB | "0x03" 8 dB | "0x1A" 7 dB | "0x05" 6 dB |
| 804 | BUFFER POS. 4 | "0x07" 15 dB | "0x6D" 8 dB | "0x46" 24 dB | "0x2F" 15 dB | "0x03" 14 dB | "0x1A" 8 dB | "0x07" 9 dB |
| 805 | BUFFER POS. 5 | "0x09" 13 dB | "0x5E" 11 dB | "0x38" 14 dB | "0x2F" 8 dB | "0x03" 14 dB | "0x12" 22 dB | "0x09" 15 dB |
| 806 | BUFFER POS. 6 | "0x08" 12 dB | "0x6A" 14 dB | "0x44" 14 dB | "0x38" 8 dB | "0x03" 6 dB | "0x11" 7 dB | "0x0B" 8 dB |

FIG. 8

|  | SYMBOL 1 | SYMBOL 2 | SYMBOL 3 | SYMBOL 4 | SYMBOL 5 | SYMBOL 6 | SYMBOL 7 |
|---|---|---|---|---|---|---|---|
| "0x01" SUM OF SNR |  |  |  |  |  |  | 12 |
| "0x03" SUM OF SNR |  |  |  |  | 61 |  | 9 |
| "0x05" SUM OF SNR |  |  |  |  |  |  | 6 |
| "0x07" SUM OF SNR | 15 |  |  |  |  |  | 9 |
| "0x08" SUM OF SNR | 43 |  |  |  |  |  |  |
| "0x09" SUM OF SNR | 13 |  |  |  |  |  | 15 |
| "0x0B" SUM OF SNR |  |  |  |  |  |  | 18 |
| "0x11" SUM OF SNR |  |  |  |  |  | 16 |  |
| "0x12" SUM OF SNR |  |  |  |  |  | 44 |  |
| "0x1A" SUM OF SNR |  |  |  |  |  | 15 |  |
| "0x2E" SUM OF SNR |  |  |  | 37 |  |  |  |
| "0x2F" SUM OF SNR |  |  |  | 15 |  |  |  |
| "0x38" SUM OF SNR |  |  | 14 | 8 |  |  |  |
| "0x44" SUM OF SNR |  |  | 14 |  |  |  |  |
| "0x45" SUM OF SNR |  |  | 16 |  |  |  |  |
| "0x46" SUM OF SNR |  |  | 47 |  |  |  |  |
| "0x5D" SUM OF SNR |  | 6 |  |  |  |  |  |
| "0x5E" SUM OF SNR |  | 11 |  |  |  |  |  |
| "0x6A" SUM OF SNR |  | 14 |  |  |  |  |  |
| "0x6D" SUM OF SNR |  | 32 |  |  |  |  |  |

FIG. 10

METHODS AND APPARATUS TO PERFORM SYMBOL-BASED WATERMARK DETECTION

RELATED APPLICATIONS

This patent arises from a continuation of U.S. patent application Ser. No. 16/050,738, which is entitled "METHODS AND APPARATUS TO PERFORM SYMBOL-BASED WATERMARK DETECTION," and was filed on Jul. 31, 2018, which was a continuation of U.S. patent application Ser. No. 15/192,676, which is entitled "METHODS AND APPARATUS TO PERFORM SYMBOL-BASED WATERMARK DETECTION," and was filed on Jun. 24, 2016. U.S. patent application Ser. No. 15/192,676 and U.S. patent application Ser. No. 16/050,738 are hereby incorporated herein by reference in its entirety. Priority to U.S. patent application Ser. No. 15/192,676 and U.S. patent application Ser. No. 16/050,738 is hereby claimed.

FIELD OF THE DISCLOSURE

This disclosure relates generally to media monitoring, and, more particularly, to methods and apparatus to perform symbol-based watermark detection.

BACKGROUND

Monitoring companies desire knowledge on how users interact with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIG. 8 is an example data table representing symbol data that may be stored in the example symbol buffer of FIG. 2.

FIG. 10 is an example data table representing summarized signal to noise ratio values that may be used to perform signal to noise ratio arbitration for selection of the most likely symbol.

The figures are not to scale. Wherever possible, the same reference numbers will be used throughout the drawing(s) and accompanying written description to refer to the same or like parts.

DETAILED DESCRIPTION

Traditionally, audience measurement entities (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

Figure 1:
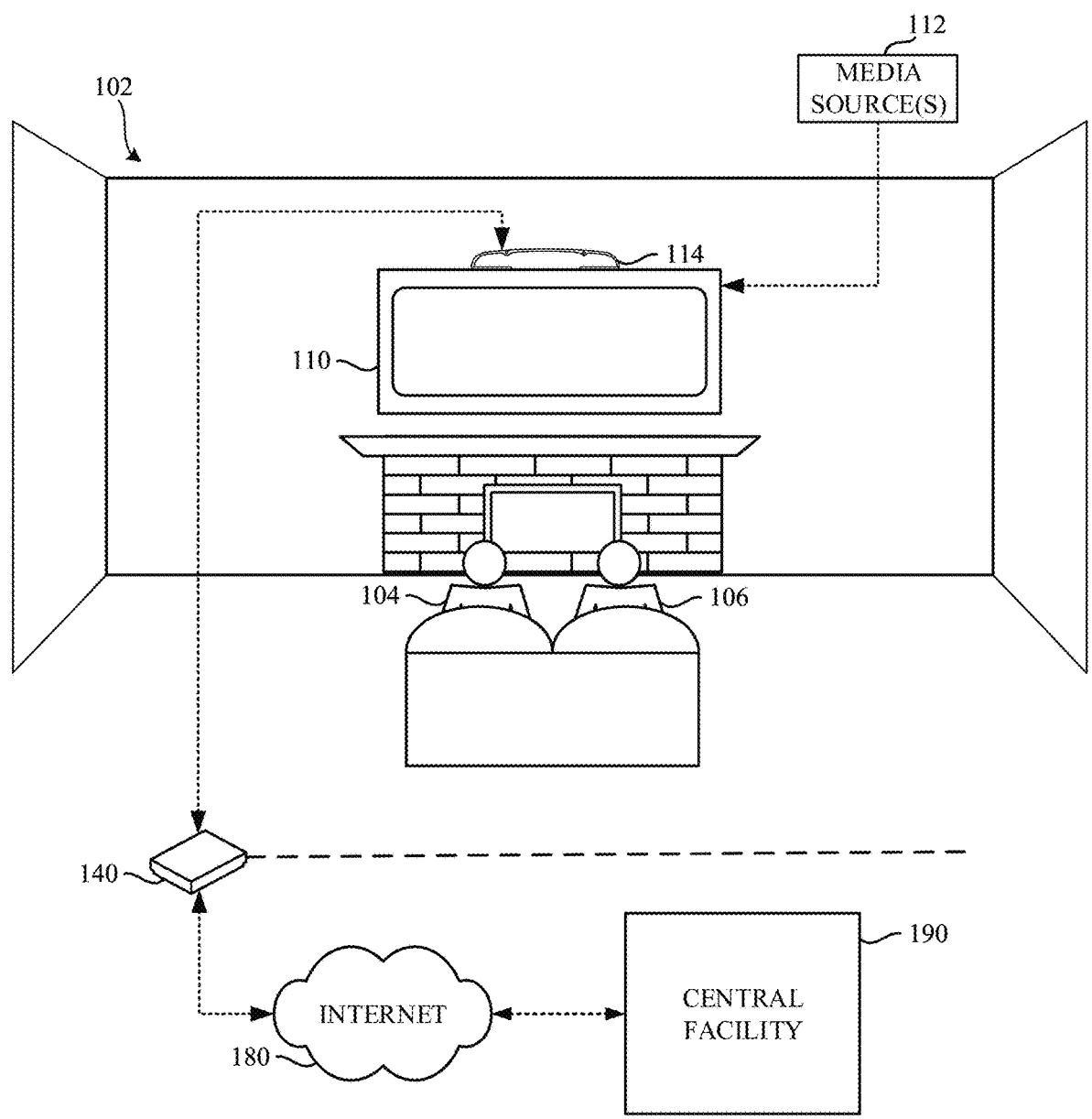
FIG. 1 is a block diagram of an example system constructed in accordance with the teachings of this disclosure for performing symbol-based watermark detection.

FIG. 1 is an illustration of an example audience measurement system constructed in accordance with the teachings of this disclosure to perform symbol based watermark detection. In the illustrated example of FIG. 1, an example media presentation environment 102 includes example panelists 104, 106, an example media presentation device 110 that receives media from an example media source 112, and an example meter 114. The example meter 114 identifies the media presented by the example media presentation device 110 and reports media monitoring information to an example central facility 190 of an example audience measurement entity via an example gateway 140 and an example network 180. In some examples, the meter 114 is referred to as an audience measurement device.

In the illustrated example of FIG. 1, the example media presentation environment 102 is a room of a household (e.g., a room in a home of a panelist, such as the home of a "Nielsen family"). In the illustrated example of FIG. 1, the example panelists 104, 106 of the household have been statistically selected to develop media ratings data (e.g., television ratings data) for a population/demographic of interest. People become panelists via, for example, a user interface presented on a media device (e.g., via the media presentation device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example of FIG. 1, one or more panelists 104, 106 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 102 is a household in the illustrated example of FIG. 1, the example media presentation environment 102 can additionally or alternatively be any other type(s) of environments such as, for example, a theater, a restaurant, a tavern, a retail location, an arena, etc.

In the illustrated example of FIG. 1, the example media presentation device 110 is a television. However, the example media presentation device 110 can correspond to any type of audio, video and/or multimedia presentation device capable of presenting media audibly and/or visually. In some examples, the media presentation device 110 (e.g., a television) may communicate audio to another media presentation device (e.g., an audio/video receiver) for output by one or more speakers (e.g., surround sound speakers, a sound bar, etc.). As another example, the media presentation device 110 can correspond to a multimedia computer system, a personal digital assistant, a cellular/mobile smartphone, a radio, a home theater system, stored audio and/or video played back from a memory, such as a digital video recorder or a digital versatile disc, a webpage, and/or any other communication device capable of presenting media to an audience (e.g., the panelists 104, 106).

The media presentation device 110 receives media from the media source 112. The media source 112 may be any type of media provider(s), such as, but not limited to, a cable media service provider, a radio frequency (RF) media provider, an Internet based provider (e.g., IPTV), a satellite media service provider, etc., and/or any combination thereof. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc. For example, the media presentation device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media.

In examples disclosed herein, an audience measurement entity provides the meter 114 to the panelist 104, 106 (or household of panelists) such that the meter 114 may be installed by the panelist 104, 106 by simply powering the meter 114 and placing the meter 114 in the media presentation environment 102 and/or near the media presentation device 110 (e.g., near a television set). In some examples, more complex installation activities may be performed such as, for example, affixing the meter 114 to the media presentation device 110, electronically connecting the meter 114 to the media presentation device 110, etc. The example meter 114 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 190 via the gateway 140 and the network 180. While the media monitoring information is transmitted by electronic transmission in the illustrated example of FIG. 1, the media monitoring information may additionally or alternatively be transferred in any other manner, such as, for example, by physically mailing the meter 114, by physically mailing a memory of the meter 114, etc.

The meter 114 of the illustrated example combines audience measurement data and people metering data. For example, audience measurement data is determined by monitoring media output by the media presentation device 110 and/or other media presentation device(s), and audience identification data (also referred to as demographic data, people monitoring data, etc.) is determined from people monitoring data provided to the meter 114. Thus, the example meter 114 provides dual functionality of an audience measurement meter that is to collect audience measurement data, and a people meter that is to collect and/or associate demographic information corresponding to the collected audience measurement data.

For example, the meter 114 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media presentation device 110. To extract media identification data, the meter 114 of the illustrated example of FIG. 1 monitors for watermarks (sometimes referred to as codes) included in the presented media. In examples disclosed herein, a watermark includes a sequence of symbols, with each symbol carrying a portion of media-identifying information which, when concatenated, form a complete watermark. In existing watermarking systems, when any symbol is indecipherable, the entire watermark is discarded. Such an approach can result in missed watermarks. In examples disclosed herein, symbol-based approaches are used to ensure that while one or more symbols may be indecipherable, that likely symbol data can be used to form a complete watermark.

Depending on the type(s) of metering the meter 114 is to perform, the meter 114 can be physically coupled to the media presentation device 110 or may be configured to capture audio emitted externally by the media presenting device 110 (e.g., free field audio) such that direct physical coupling to the media presenting device 110 is not required. For example, the meter 114 of the illustrated example may employ non-invasive monitoring not involving any physical connection to the media presentation device 110 (e.g., via Bluetooth® connection, WIFI® connection, acoustic sensing via one or more microphone(s) and/or other acoustic sensor(s), etc.) and/or invasive monitoring involving one or more physical connections to the media presentation device 110 (e.g., via USB connection, a High Definition Media Interface (HDMI) connection, an Ethernet cable connection, etc.).

In examples disclosed herein, to monitor media presented by the media presentation device 110, the meter 114 of the illustrated example senses audio (e.g., acoustic signals or ambient audio) output (e.g., emitted) by the media presentation device 110. For example, the meter 114 processes the signals obtained from the media presentation device 110 to detect media and/or source identifying signals (e.g., audio watermarks) embedded in portion(s) (e.g., audio portions) of the media presented by the media presentation device 110. To, for example, sense ambient audio output by the media presentation device 110, the meter 114 of the illustrated example includes an example acoustic sensor (e.g., a microphone). In some examples, the meter 114 may process audio signals obtained from the media presentation device 110 via a direct cable connection to detect media and/or source identifying audio watermarks embedded in such audio signals.

To generate exposure data for the media, identification(s) of media to which the audience is exposed are correlated with people data (e.g., presence information) collected by the meter 114. The meter 114 of the illustrated example collects inputs (e.g., audience identification data) representative of the identities of the audience member(s) (e.g., the panelists 104, 106). In some examples, the meter 114 collects audience identification data by periodically and/or a-periodically prompting audience members in the media presentation environment 102 to identify themselves as present in the audience. In some examples, the meter 114 responds to predetermined events (e.g., when the media presenting device 110 is turned on, a channel is changed, an infrared control signal is detected, etc.) by prompting the audience member(s) to self-identify. The audience identification data and the exposure data can then be complied with the demographic data collected from audience members such as, for example, the panelists 104, 106 during registration to develop metrics reflecting, for example, the demographic composition of the audience. The demographic data includes, for example, age, gender, income level, educational level, marital status, geographic location, race, etc., of the panelist.

In some examples, the meter 114 may be configured to receive panelist information via an input device such as, for example, a remote control, an Apple® iPad®, a cell phone, etc. In such examples, the meter 114 prompts the audience members to indicate their presence by pressing an appropriate input key on the input device. The meter 114 of the illustrated example may also determine times at which to prompt the audience members to enter information to the meter 114. In some examples, the meter 114 of FIG. 1 supports audio watermarking for people monitoring, which enables the meter 114 to detect the presence of a panelist-identifying metering device in the vicinity (e.g., in the media presentation environment 102) of the media presentation device 110. For example, the acoustic sensor of the meter 114 is able to sense example audio output (e.g., emitted) by an example panelist-identifying metering device, such as, for example, a wristband, a cell phone, etc., that is uniquely associated with a particular panelist. The audio output by the example panelist-identifying metering device may include, for example, one or more audio watermarks to facilitate identification of the panelist-identifying metering device and/or the panelist 104 associated with the panelist-identifying metering device.

The meter 114 of the illustrated example communicates with a remotely located central facility 190 of the audience measurement entity. In the illustrated example of FIG. 1, the example meter 114 communicates with the central facility 190 via a gateway 140 and a network 180. The example meter 114 of FIG. 1 sends media identification data and/or audience identification data to the central facility 190 periodically, a-periodically and/or upon request by the central facility 190.

The example gateway 140 of the illustrated example of FIG. 1 can be implemented by a router that enables the meter 114 and/or other devices in the media presentation environment (e.g., the media presentation device 110) to communicate with the network 180 (e.g., the Internet.)

In some examples, the example gateway 140 facilitates delivery of media from the media source(s) 112 to the media presentation device 110 via the Internet. In some examples, the example gateway 140 includes gateway functionality such as modem capabilities. In some other examples, the example gateway 140 is implemented in two or more devices (e.g., a router, a modem, a switch, a firewall, etc.). The gateway 140 of the illustrated example may communicate with the network 126 via Ethernet, a digital subscriber line (DSL), a telephone line, a coaxial cable, a USB connection, a Bluetooth connection, any wireless connection, etc.

In some examples, the example gateway 140 hosts a Local Area Network (LAN) for the media presentation environment 102. In the illustrated example, the LAN is a wireless local area network (WLAN), and allows the meter 114, the media presentation device 110, etc., to transmit and/or receive data via the Internet. Alternatively, the gateway 140 may be coupled to such a LAN.

The network 180 of the illustrated example can be implemented by a wide area network (WAN) such as the Internet. However, in some examples, local networks may additionally or alternatively be used. Moreover, the example network 180 may be implemented using any type of public or private network such as, but not limited to, the Internet, a telephone network, a local area network (LAN), a cable network, and/or a wireless network, or any combination thereof.

The central facility 190 of the illustrated example is implemented by one or more servers. The central facility 190 processes and stores data received from the meter(s) 114. For example, the example central facility 190 of FIG. 1 combines audience identification data and program identification data from multiple households to generate aggregated media monitoring information. The central facility 190 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the meter 114 of the illustrated example provides a combination of media metering and people metering. The meter 114 of FIG. 1 includes its own housing, processor, memory and/or software to perform the desired media monitoring and/or people monitoring functions. The example meter 114 of FIG. 1 is a stationary device disposed on or near the media presentation device 110. To identify and/or confirm the presence of a panelist present in the media presentation environment 102, the example meter 114 of the illustrated example includes a display. For example, the display provides identification of the panelists 104, 106 present in the media presentation environment 102. For example, in the illustrated example, the meter 114 displays indicia (e.g., illuminated numerical numerals 1, 2, 3, etc.) identifying and/or confirming the presence of the first panelist 104, the second panelist 106, etc. In the illustrated example, the meter 114 is affixed to a top of the media presentation device 110. However, the meter 114 may be affixed to the media presentation device in any other orientation, such as, for example, on a side of the media presentation device 110, on the bottom of the media presentation device 110, and/or may not be affixed to the media presentation device 110. For example, the meter 114 may be placed in a location near the media presentation device 110.

Figure 2:
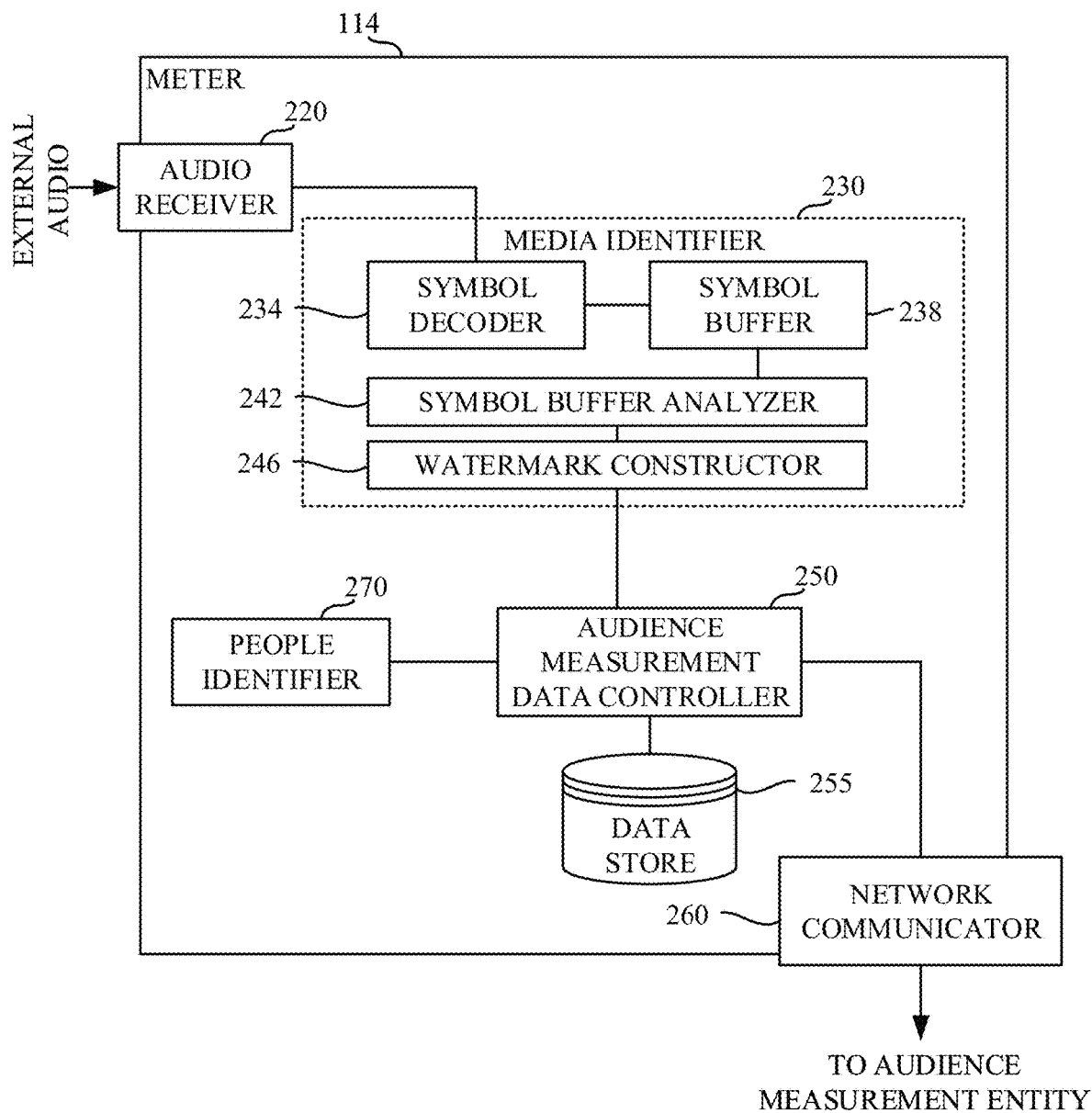
FIG. 2 is a block diagram of the example meter of FIG. 1.

FIG. 2 is a block diagram illustrating an example implementation of the example meter 114 of FIG. 1. The example meter 114 of FIG. 2 includes an example audio receiver 220, an example media identifier 230, an example audience measurement data controller 250, an example data store 255, an example network communicator 260, and an example people identifier 270. In examples disclosed herein, the media identifier 230 includes an example symbol decoder 234, an example symbol buffer 238, an example symbol buffer analyzer 242, and an example watermark constructor 246.

The example audio receiver 220 of the illustrated example of FIG. 2 is a microphone. The example audio receiver 220 receives ambient sound (e.g., free field audio) including audible media presented in the vicinity of the meter 114. Alternatively, the audio receiver 220 may be implemented by a line input connection. The line input connection may allow an external microphone to be used with the meter 114 and/or, in some examples, may enable the meter 114 to be directly connected to an output of a media presentation device (e.g., an auxiliary output of a television, an auxiliary output of an audio/video receiver of a home entertainment system, etc.) Advantageously, the meter 114 is positioned in a location such that the audio receiver 220 receives ambient audio produced by the television and/or other devices of the home entertainment system with sufficient quality to identify media presented by the media presentation device 110 and/or other devices of the media presentation environment 102. For example, in examples disclosed herein, the meter 114 may be placed on top of the television, secured to the bottom of the television, etc.

The example media identifier 230 of the illustrated example of FIG. 2 analyzes audio received via the audio receiver 220 and identifies the media being presented. The example media identifier 230 of the illustrated example outputs an identifier of the media to the audience measurement data controller 250. In examples disclosed herein, the media identifier 230 utilizes audio watermarking techniques to identify the media. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or one or more identifier(s) that may be mapped to media identifying information, into an audio and/or video component of the media. In some examples, the audio or video component of the media is selected to have a signal characteristic sufficient to hide the watermark. As used herein, the terms "code" and/or "watermark" are used interchangeably, and are defined to mean any identification information (e.g., an identifier) that may be inserted or embedded in the audio and/or video of media (e.g., a program or advertisement) for the purpose of identifying the media or for another purpose such as tuning (e.g., a packet identifying header). As used herein "media" refers to audio and/or visual (still or moving) content and/or advertisements. In some examples, to identify watermarked media, the watermark(s) are extracted and used to access a table of reference watermarks that are mapped to media identifying information.

As noted above, a watermark includes a sequence of symbols, each symbol carrying a portion of media-identifying information which, when concatenated, form a complete watermark. An example arrangement of symbols within a watermark is discussed below in connection with the illustrated example of FIG. 3. In existing watermarking systems, when any symbol within the watermark is indecipherable, the entire watermark is discarded. Such an approach can result in missed watermarks. In examples disclosed herein, symbol-based approaches are used to ensure that while one or more symbols may be indecipherable, that likely symbol data can be determined and used to form a complete watermark.

In the illustrated example of FIG. 2, the example media identifier includes the example symbol decoder 234, the example symbol buffer 238, the example symbol buffer analyzer 242, and the example watermark constructor 246.

The example symbol decoder 234 of FIG. 2 analyzes the audio received via the audio receiver 220 and identifies a symbol within a watermark. As discussed below in connection with FIGS. 3, 4, and/or 5, an example watermark includes seven symbols presented sequentially through time. Also, in some examples, successive watermarks embedded in the audio may contain some symbols that are the same, and some symbols that change from watermark to watermark. During each of the symbol times, the example symbol decoder 234 analyzes the audio to extract a value reflecting the corresponding symbol. The symbol decoder 234 also determines a signal to noise ratio of the corresponding symbol. The signal to noise ratio identifies a strength of the detected value of the symbol. Detected values that receive a high signal to noise ratio (e.g., the signal is easily distinguishable from noise) are generally more reliable than values that receive a low signal to noise ratio (e.g., the signal is not easily distinguishable from noise). The value of the symbol and the corresponding signal to noise ratio are stored in the symbol buffer 238.

The example symbol buffer 238 may be any device for storing data, such as, for example, flash memory, magnetic media, optical media, etc. Furthermore, the data stored in the symbol buffer 238 may be in any data format, such as, for example, binary data, comma delimited data, tab delimited data, structured query language (SQL) structures, etc. While the symbol buffer 238 is illustrated as a single memory in the illustrated example, the symbol buffer 238 may be implemented by any number and/or type(s) of memories. The example symbol buffer 238 stores values indicative of the signal-to-noise ratios corresponding to the respective detected symbols. In the illustrated example of FIG. 2, the example symbol buffer 238 includes six buffer positions. That is, the symbol buffer 238 stores six historic symbol values and corresponding signal-to-noise ratios for each detected symbol. In the illustrated example of FIG. 2, the symbol values and their corresponding signal-to-noise ratios are stored in a same memory element. However, the symbol values and their corresponding signal-to-noise ratios may be stored in separate memory locations (e.g., in separate memory devices, in separate memory addresses, etc.)

The example symbol buffer analyzer 242 of the illustrated example of FIG. 2 analyzes values stored in the symbol buffer 238 to identify the most likely value of each symbol. In some examples, the example symbol buffer analyzer 242, on a symbol-by-symbol basis, inspects the symbol values to determine which value occurred with the highest frequency. In some examples, the symbol buffer analyzer further analyzes the signal-to-noise ratios associated with symbol values stored in the buffer to identify strongest symbol value. Furthermore, the symbol buffer analyzer may perform pattern analysis on the symbol values of the buffer to, for example, identify when a symbol value was likely to have changed throughout the history recorded in the symbol buffer. For example, the symbol value stored in the first position of the symbol buffer 238 may be expected to be different from the value stored in the second position of the buffer when, for example, the values are expected to change over time. For each symbol, the example symbol buffer analyzer 242 provides the selected symbol value to the example watermark constructor 248.

The example watermark constructor 248 of the illustrated example of FIG. 2 takes each of the symbol values received from the symbol buffer analyzer 242 and concatenates the symbol values to form a complete watermark. In some examples, no watermark can be created because, for example, the symbol buffer analyzer 242 does not provide all of the symbol components of the watermark (e.g., despite a best-effort, the symbol may still be indecipherable). In such an example, the watermark may be discarded. The example watermark constructor 248 provides the completed watermark to the audience measurement data controller 250.

The example audience measurement data controller 250 of the illustrated example of FIG. 2 receives media identifying information (e.g., a code, a signature, etc.) from the media identifier 230 and audience identification data from the people identifier 270, and stores the received information in the data store 255. The example audience measurement data controller 250 periodically and/or a-periodically transmits, via the network communicator 260, the audience measurement information stored in the data store 255 to the central facility 190 for aggregation and/or preparation of media monitoring reports.

The example data store 255 of the illustrated example of FIG. 2 may be implemented by any device for storing data, such as, for example, flash memory, magnetic media, optical media, etc. Furthermore, the data stored in the example data store 255 may be in any data format, such as, for example, binary data, comma delimited data, tab delimited data, structured query language (SQL) structures, etc. In the illustrated example, the example data store 255 stores media identifying information collected by the media identifier 230 and audience identification data collected by the people identifier 270. In some examples, the example data store 255 additionally stores panelist demographic information such that received user identifiers of the audience measurement data can be translated into demographic information prior to transmission to the central facility 190.

The example people identifier 270 of the illustrated example of FIG. 2 determines audience identification data representative of the identities of the audience member(s) (e.g., panelists) present in the media presentation environment 102. In some examples, the people identifier 270 collects audience identification data by periodically and/or a-periodically prompting audience members in the media presentation environment 102 to identify themselves as present in the audience. Panelists may identify themselves by, for example, pressing a button on a remote, speaking their name, etc. In some examples, the people identifier 270 prompts the audience member(s) to self-identify in response to one or more predetermined events (e.g., when the media presentation device 110 is turned on, a channel is changed, an infrared control signal is detected, etc.). The people identifier 270 provides the audience identification data to the audience measurement data controller such that the audience measurement data can be correlated with the media identification data to facilitate an identification of which media was presented to which audience member.

The example network communicator 260 of the illustrated example of FIG. 2 transmits audience measurement information provided by the audience measurement data controller 250 (e.g., data stored in the data store 255) to the central facility 190 of the audience measurement entity. In the illustrated example, the network communicator 260 is implemented by an Ethernet port that communicates via an Ethernet network (e.g., a local area network (LAN)). In some examples, the network communicator 260 facilitates wireless communication via a WiFi network hosted by the example gateway 140 of FIG. 1.

Figure 3:
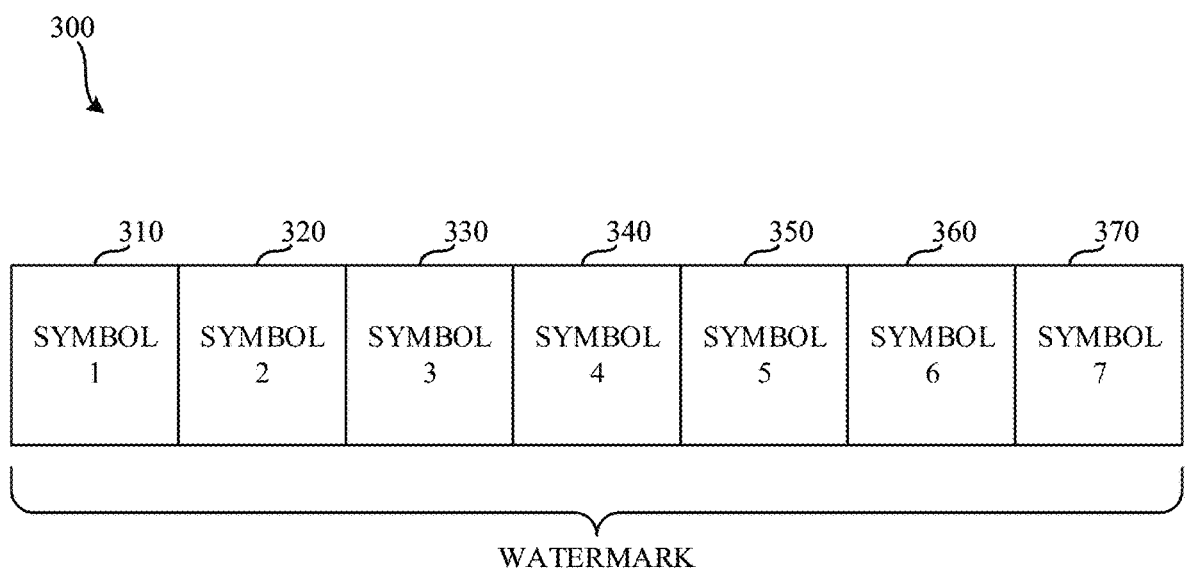
FIG. 3 is a block diagram of an example watermark that may be identified by the example meter of FIGS. 1 and/or 2.

FIG. 3 is a block diagram of an example watermark 300 that may be identified by the example meter 114 of FIGS. 1 and/or 2. The example watermark 300 of the illustrated example of FIG. 3 includes seven symbols 310, 320, 330, 340, 350, 360, 370. However, in some examples, the example watermark 300 may include fewer and/or additional symbols. In the illustrated example, each symbol includes seven bits (e.g., with each bit being a binary one or zero). However, each symbol may take on values that represent any other length and/or size, and/or type(s) of information. For example, each symbol may represent one bit of information, 10 bits of information, 100 bits of information, etc. Furthermore, in the illustrated example of FIG. 3, each symbol represents the same number of bits. However, in some examples, different symbols may represent different amounts of information. For example, the first symbol 310 may represent six bits of information, while the second symbol 320 may represent twenty bits of information. In general, smaller symbol sizes may be expected to be more easily distinguished, as there are less data points where an error may occur.

Figure 4:
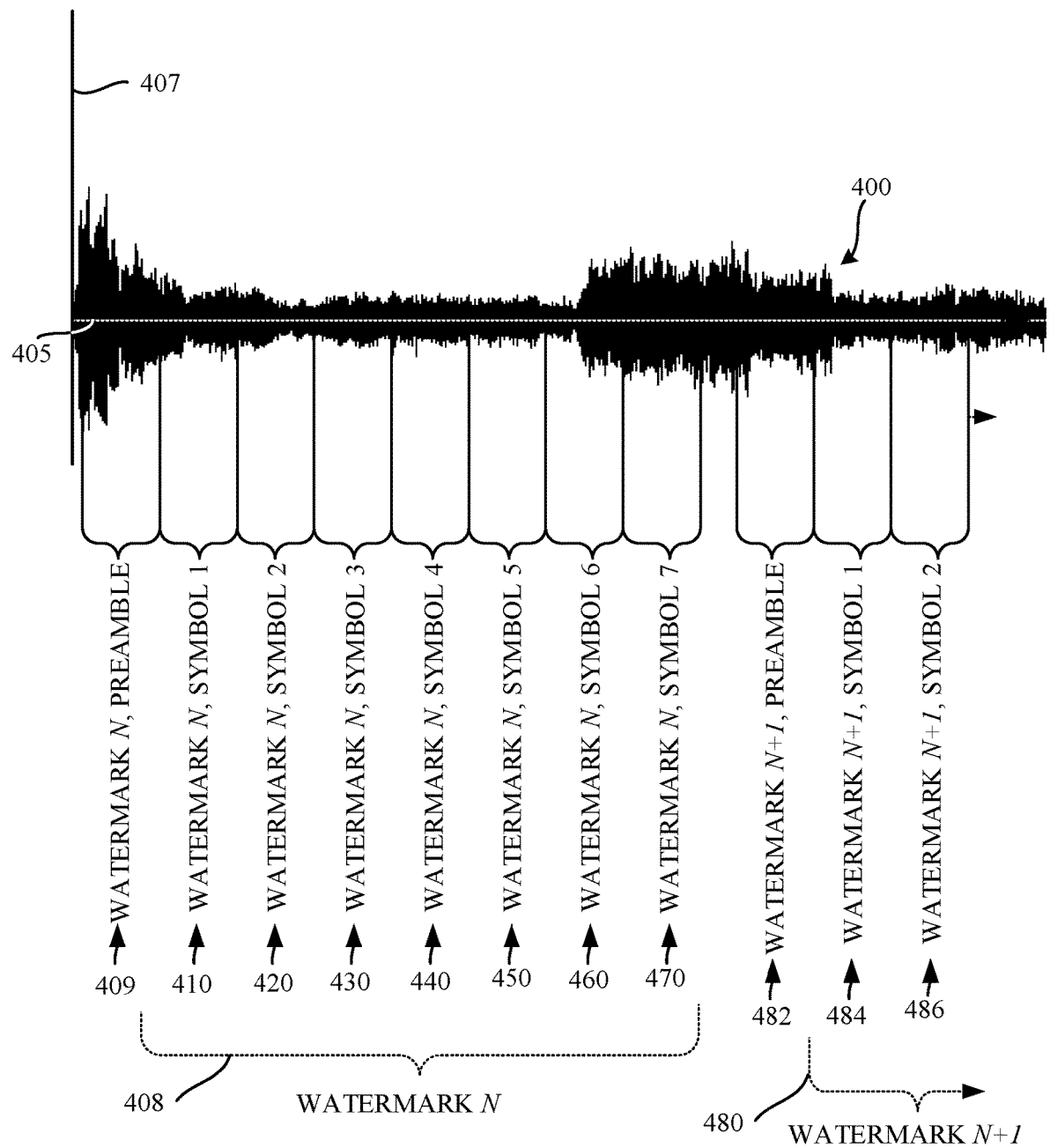
FIG. 4 is an illustration of an audio waveform and corresponding portions of time within the audio waveform in which portions of the example watermark of FIG. 3 are encoded.

FIG. 4 is an illustration of an example audio waveform 400 and corresponding portions of time within the audio waveform 400 in which portions of the example watermark of FIG. 3 are encoded. The example waveform 400 of the illustrated example of FIG. 4 is presented along a horizontal time axis 405, and a vertical amplitude axis 407. The example audio waveform 400 of the illustrated example of FIG. 4 includes a first example watermark 408 and the beginning portions of a second example watermark 480 transmitted over the time axis 405. In practice, the watermark(s) may be preceded by a preamble to, for example, identify the type of watermark about to be conveyed and/or properties of the watermark. For example, watermark 408 (also referred to as watermark N in FIG. 4) is preceded by a first example preamble 409, and the watermark 480 (also referred to as watermark N+1 in FIG. 4) is preceded by a second example preamble 482. In the illustrated example of FIG. 4, the watermark 408 and its corresponding preamble 409 are represented by approximately 1.6 seconds of the audio waveform 400. In examples disclosed herein, each watermark begins two seconds apart from each other. That is, the beginning of the watermark 480 starts two seconds after the beginning of the watermark 408. As noted in connection with FIG. 3, each watermark includes seven symbol segments. In examples disclosed herein, each symbol segment and preamble are presented for 192 milliseconds.

In the illustrated example of FIG. 4, the preamble 409 of the first watermark 408 is transmitted. Next, the first symbol 410 of the first watermark 408 is transmitted, followed sequentially by the second symbol 420, the third symbol 430, the fourth symbol 440, the fifth symbol 450, the sixth symbol 460, and the seventh symbol 470. After a delay between symbols (approximately one third of a duration of a symbol, approximately 64 milliseconds, etc.), a second preamble 482 corresponding to the second watermark 480 is transmitted. The second preamble 482 is followed by the first symbol of the second watermark 484, the second symbol of the second watermark 486, etc. Watermarks are continually repeated, when included in the presented media.

Figure 5:
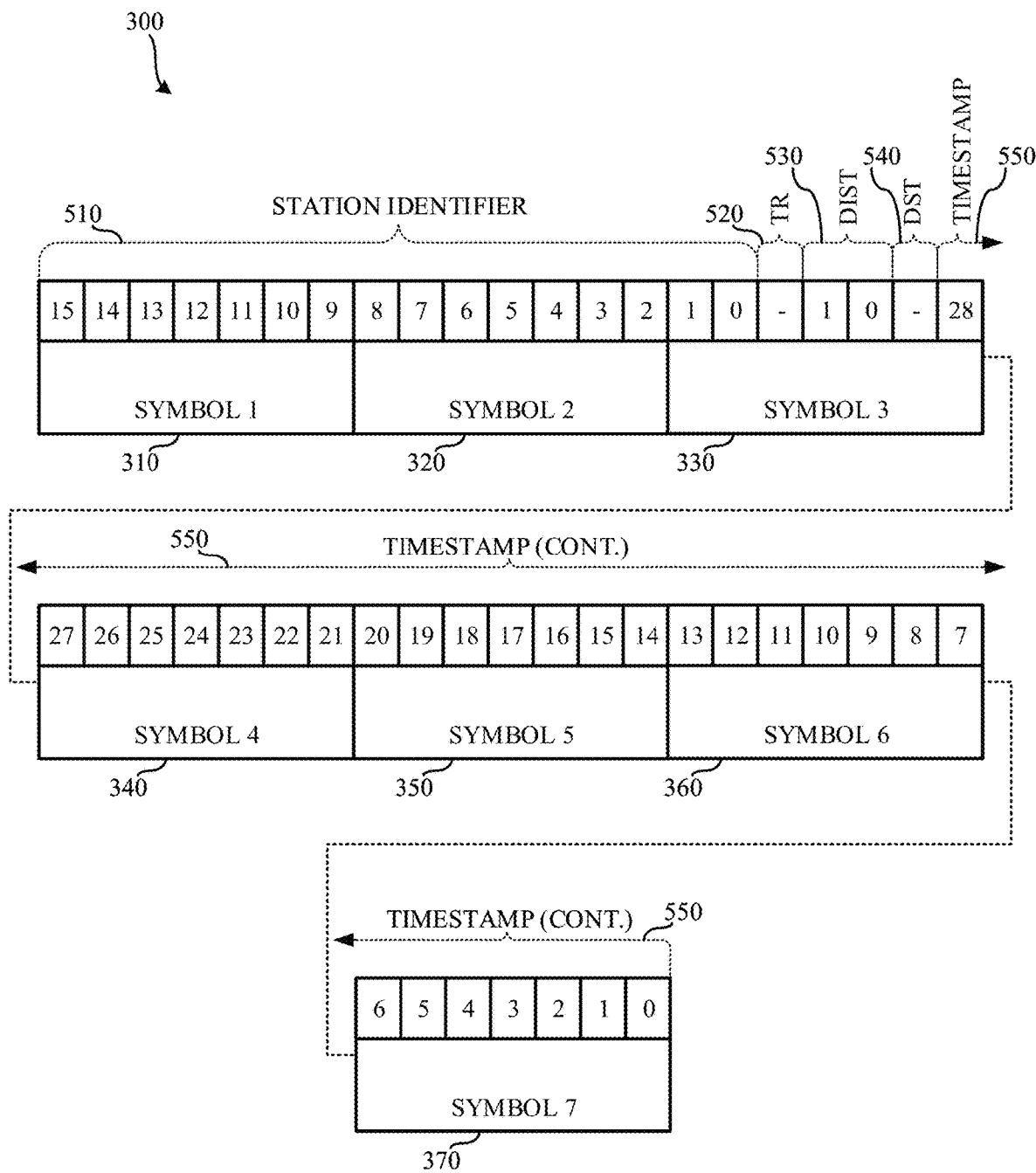
FIG. 5 is a block diagram illustrating information components represented by the different symbols of the example watermark of FIG. 3.

FIG. 5 is a block diagram illustrating example information components represented by the different symbols of the example watermark 300 of FIG. 3. As noted in connection with FIG. 3, each example watermark includes seven symbols that each encode seven bits of information. In total, the example watermark 300 includes forty-nine bits of information. In the illustrated example of FIG. 5, these forty-nine bits include a sixteen bit station identifier 510, followed by a reserved bit 520, followed by a two bit distribution channel identifier 530, followed by a one bit daylight savings time flag 540, followed by a twenty eight bit timestamp 550.

The example station identifier 510 identifies the station over which the media is broadcast. For example, the station identifier 510 may identify a television station (e.g., channel 7, National Broadcasting Company (NBC), etc.). In the illustrated example of FIG. 5, the station identifier 510 spans over the first symbol 310 (seven bits), the second symbol 320 (seven bits), and the first two bits of the third symbol 330. However, the station identifier 510 may be positioned in any other location(s) of the watermark 300.

The example reserved bit 520 is positioned as the third bit of the third symbol 330. However, the example reserved bit 520 may be positioned in the other location of the watermark. Moreover, in some examples, the reserved bit 520 may be omitted and/or additional bits of the watermark 300 may be reserved.

The example two bit distribution channel identifier 530 is represented as the fourth and fifth bits of the third example symbol 330 in the illustrated example of FIG. 5. The example two bit distribution channel identifier 530 identifies the type of distribution channel over which the media is being transmitted for presentation. For example, the distribution channel identifier 530 may identify that the media is being broadcast over a live broadcast system (e.g., a cable television network, an IPTV network, etc.) In some examples, the distribution channel identifier may identify that the media is being distributed in a stored format (e.g., in a DVD and/or Blu-ray). In some examples the distribution channel identifier may identify that the media is being streamed (e.g., transmitted via the Internet).

The example one bit daylight savings time identifier 540 is represented as the sixth bit of the third symbol 330. However, the example one bit daylight savings time identifier 540 may be located in any other position of the watermark. In the illustrated example, the daylight savings time identifier 540 identifies whether daylight savings time is active in the region over which the media is being broadcast. Including the daylight savings time identifier 540 assists in the identification of the media based on the station identifier 510 and the timestamp 550. For example, while a first program may be presented at a first time identified by the timestamp 550, a second, different, program may be presented at a second time one hour later than the first time. The daylight savings time identifier 540 enables identification of which media was presented.

The example timestamp 550 of the illustrated example of FIG. 5 is represented as the seventh bit of the third symbol 330, the fourth symbol 340, the fifth symbol 350, the sixth symbol 360, and the seventh symbol 370. In the illustrated example, the timestamp is a twenty nine bit representation of the time at which the media was broadcast. The timestamp 550, in combination with the station identifier 510, enables the audience measurement entity to identify the media. In the illustrated example of FIG. 5, the higher order bits (e.g., bits representing the year, month, and/or day of the timestamp), are represented in the third symbol 330, fourth symbol 340, and fifth symbol 350. The lower order bits of the timestamp (e.g., bits representing the minutes and/or seconds of the timestamp) are represented in the sixth symbol 360 and the seventh symbol 370. As such the higher order bits (e.g., the third symbol 330, the fourth symbol 340, and/or the fifth symbol 350) are not expected to change frequently (e.g., from one watermark to the next watermark transmitted approximately two seconds later). However, the lower order symbol (e.g., the sixth symbol 360 and the seventh symbol 370) are expected to change at a more frequent pace. For example, the seventh symbol 370, which represents the minutes and seconds portion of the timestamp is expected to change upon every successive watermark. As such, between subsequent watermarks, the seventh symbol 370 is not expected to be the same. As a result, inspection of the symbol to identify repeating values, is not likely to provide a repeated result. Instead, the values of the seventh symbol 370 are likely to be changed at a regular cadence. To account for such changes, pattern matching may be applied to identify the likely value of the seventh symbol 370 of the watermark 300.

While an example manner of implementing the example meter 114 of FIG. 1 is illustrated in FIG. 2, one or more of the elements, processes and/or devices illustrated in FIG. 2 may be combined, divided, re-arranged, omitted, eliminated and/or implemented in any other way. Further, the example audio receiver 220, the example media identifier 230, the example symbol decoder 234, the example symbol buffer 238, the example symbol buffer analyzer 242, the example watermark constructor, the example audience measurement data controller 250, the example data store 255, the example people identifier 270, the example network communicator 260, and/or, more generally, the example meter 114 of FIGS. 1 and/or 2 may be implemented by hardware, software, firmware and/or any combination of hardware, software and/or firmware. Thus, for example, any of the example audio receiver 220, the example media identifier 230, the example symbol decoder 234, the example symbol buffer 238, the example symbol buffer analyzer 242, the example watermark constructor, the example audience measurement data controller 250, the example data store 255, the example people identifier 270, the example network communicator 260, and/or, more generally, the example meter 114 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio receiver 220, the example media identifier 230, the example symbol decoder 234, the example symbol buffer 238, the example symbol buffer analyzer 242, the example watermark constructor, the example audience measurement data controller 250, the example data store 255, the example people identifier 270, the example network communicator 260, and/or, more generally, the example meter 114 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 114 of FIGS. 1 and/or 2 may include one or more elements, processes and/or devices in addition to, or instead of, those illustrated in FIG. 2, and/or may include more than one of any or all of the illustrated elements, processes and devices.

Figure 6:
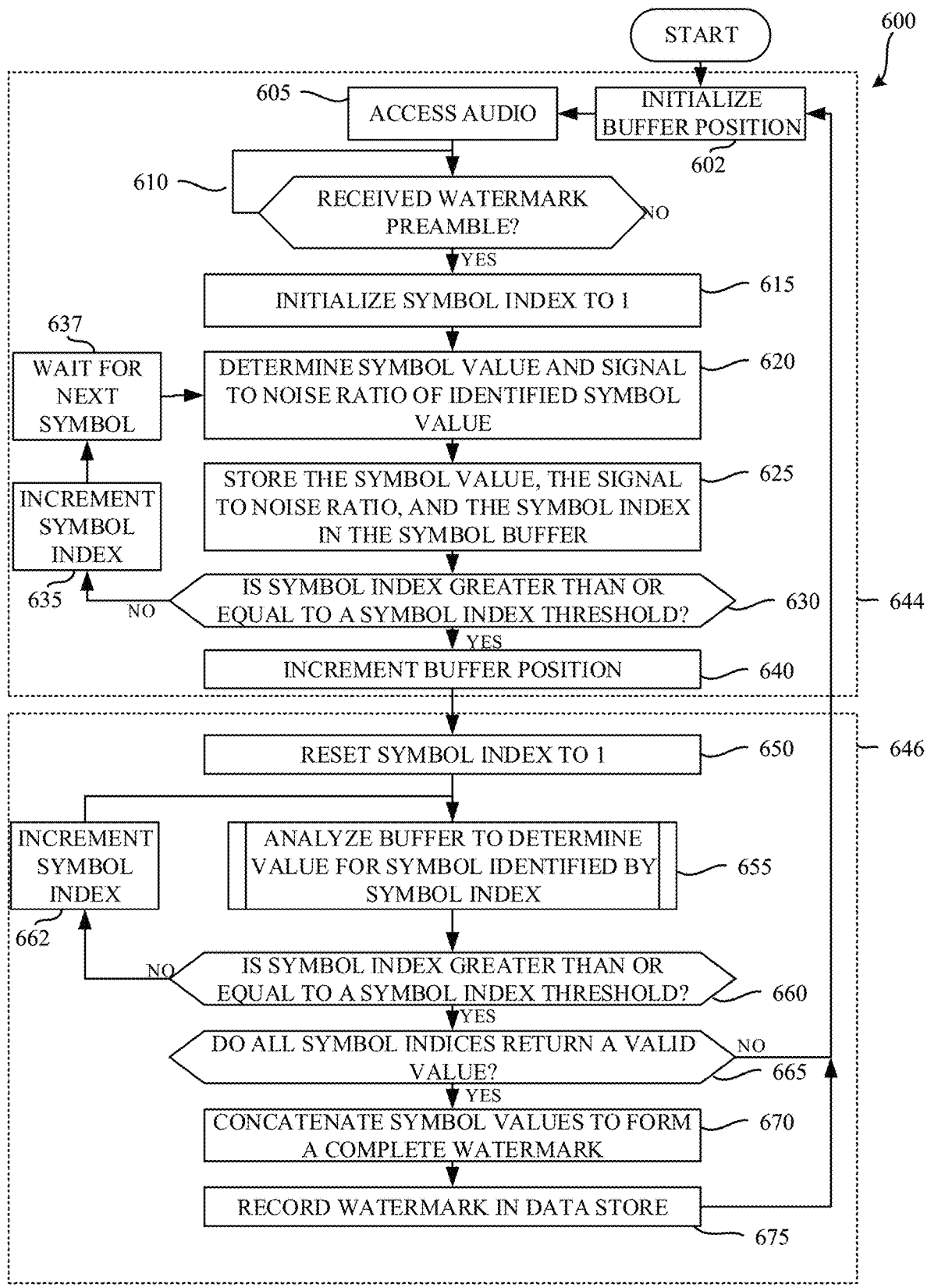
FIG. 6 is a flowchart representative of example machine-readable instructions that may be executed to implement the meter of FIG. 1 to perform symbol-based watermark detection.
Figure 7:
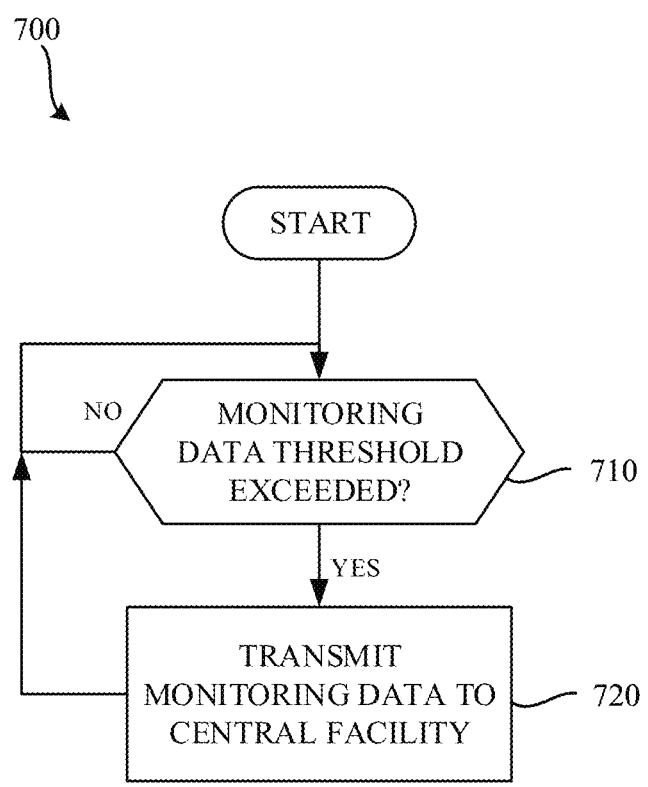
FIG. 7 is a flowchart representative of example machine-readable instructions that may be executed to implement the example meter of FIGS. 1 and/or 2 to transmit media monitoring information to the example central facility of FIG. 1.

Flowcharts representative of example machine readable instructions for implementing the example meter 114 of FIGS. 1 and/or 2 are shown in FIGS. 6, 7, and/or 9. In these examples, the machine readable instructions comprise a program(s) for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program(s) is/are described with reference to the flowchart(s) illustrated in FIGS. 6, 7, and/or 9, many other methods of implementing the example meter 114 may alternatively be used. For example, the order of execution of the blocks may be changed, and/or some of the blocks described may be changed, eliminated, or combined.

As mentioned above, the example processes of FIGS. 6, 7, and/or 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, and/or 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart representative of example machine-readable instructions 600 that may be executed to implement the meter 114 of FIGS. 1 and/or 2 to perform symbol-based watermark detection. The example program of FIG. 6 begins when the example symbol decoder 234 initializes a buffer position. (Block 602). The buffer position identifies one or more at memory addresses within the symbol buffer 238 in which symbol values are to be stored.

The example symbol decoder 234 accesses audio received via the audio receiver 220. (Block 605). The symbol decoder 234 determines whether a watermark preamble has been received. (Block 610). As shown in the illustrated example of FIG. 4, a watermark preamble (e.g., the watermark preamble 409) precedes the watermark symbols (e.g., the symbols 410, 420, 430, 440, 450, 460, 470) and is used to, for example, identify a beginning of a transmission of the watermark 408 and/or a format in which the watermark 408 is to be transmitted. If no message preamble is received (Block 610 returns a result of NO), the example symbol decoder 234 continues to monitor the audio received via the audio receiver 220 to identify a watermark preamble. (Block 610).

Upon detection of the watermark preamble (Block 610 returns a result of YES), the example symbol decoder 234 initializes a symbol index to one. (Block 615). The example symbol index is used to identify which symbol of the watermark is being received. The example symbol decoder 234 determines a symbol value and a signal-to-noise ratio of the identified symbol value. (Block 620). In the illustrated example, the example symbol value and/or signal-to-noise ratio may be identified by, for example, performing frequency analysis on the received audio to extract the symbol value. When used in connection with the buffer position (initialized in connection with Block 602), the symbol index enables identification of a memory address within the symbol buffer 238 in which the symbol value and/or signal to noise ratio is to be stored. As discussed below in connection with FIG. 8, the identified symbol value and the identified signal to noise ratio may be stored in a shared memory space. However, in some examples, the symbol value and the identified signal to noise ratio may be stored in separate memory spaces (e.g., in separate sectors of the buffer memory, in a separate memory device, etc.). The example symbol decoder 234 stores the symbol value and/or the signal-to-noise ratio in the symbol buffer 238. (Block 625).

The example symbol decoder 234 identifies whether the symbol index is greater than or equal to a symbol index threshold. (Block 630). In the illustrated example of FIG. 6, the symbol index threshold corresponds to the number of expected symbols. In examples disclosed herein, because seven symbols are used to construct the watermark, the symbol index threshold is seven. However, any other symbol index threshold may additionally or alternatively be used. In some examples, the symbol index threshold may be communicated in the watermark preamble.

If the symbol index is not greater than or equal to the symbol index threshold (Block 630 returns a result of NO), additional symbols are expected to be received for the watermark. The example symbol decoder 234 increments the symbol index. (Block 635). The example symbol decoder 234 then waits for the next symbol. (Block 637). As described in connection with the illustrated example of FIG. 4, there may be a small delay (e.g., 8 milliseconds), between each symbol. The example symbol decoder waits the appropriate amount of time until the next symbol is expected to be transmitted. In some examples, the symbol decoder 234 may wait until a midpoint within the expected time of transmission of the symbol to ensure that adjoining symbols do not interfere with the symbol data to be identified. The example process of blocks 620, 625, 630, 635, 637 is then repeated until the symbol index is greater than or equal to the symbol index threshold. That is, the process is repeated until all symbols of the current watermark being detected have had their symbol values and corresponding signal-to-noise ratios added to the symbol buffer 238.

If the symbol index is greater than or equal to the symbol index threshold (Block 630 returns a result of YES), the example symbol decoder 234 increments the buffer position that was initialized in block 602. (Block 640). In examples disclosed herein, six possible buffer positions are used. As such, when the buffer position is to be incremented to be greater than six, in some examples, the buffer position may be reinitialized to a starting value (e.g., one).

In the illustrated example of FIG. 6, blocks 602 through 640, and/or, more generally, block 644, represent operations that receive incoming audio and store symbol values in the symbol buffer 238. Block 646 represents operations that analyze the symbol buffer 238 to identify a most likely symbol value for each symbol. In the illustrated example of FIG. 6, block 646 is serially performed after the symbol index exceeds the symbol index threshold. In examples disclosed herein, the symbol index threshold is expected to be exceeded approximately every two seconds (corresponding to the period of time between sequential watermarks). As a result, analysis of the symbol values stored in the symbol buffer 238 (Block 646) is also performed approximately every two seconds. However, block 644 and block 646 may be operated in any other fashion. For example, in some examples, the symbol collection of blocks 644 may be operated in parallel with the symbol analysis of blocks 646. In some examples, the symbol analysis of block 646 may be performed at a frequency different than the frequency at which the block 644 is expected to be completed. For example, the symbol analysis of block 646 may be operated every 100 milliseconds, whereas the symbol collection of block 644 is expected to be completed approximately every two seconds, corresponding to the length of time used to transmit complete watermark.

To perform the signal symbol buffer analysis of block 646, the example symbol buffer analyzer 242 resets the symbol index to one. (Block 650). The example symbol buffer analyzer 242 analyzes the symbol buffer 238 to determine a most likely value for the symbol identified by the symbol index. (Block 655). In the illustrated example of FIG. 6, the symbol buffer analyzer 242 analyzes each of the buffer positions (e.g., a buffer history representing previously collected symbols), to identify the most likely symbol value. In examples disclosed herein, because six buffer positions are provided for each watermark symbol, and each watermark corresponds to approximately two seconds, approximately twelve seconds of history are analyzed to identify the most likely symbol value. In effect, a sliding window is created where, for example, the most recent twelve seconds of symbol data are analyzed every two seconds.

In some examples, the symbol buffer analyzer 242 analyzes, for a given symbol, a number of positions within the buffer that represents less than the entire buffer history. For example, while the buffer history may include six positions for each symbol, the symbol buffer analyzer 242 may analyze the four most recent positions (corresponding to the most recent eight seconds of symbol data). Such an approach may be useful when, for example, the four most recent positions do not provide a conclusive most likely value for a symbol, such that the additional two positions may be consulted to assist in the determination of the most likely value for the symbol (e.g., for arbitration of a tie). Further details concerning operations for analyzing the symbol buffer 238 to determine the most likely value for the symbol identified by the symbol index are disclosed in connection with FIG. 9.

The example symbol buffer analyzer 242 determines whether the symbol index is greater than or equal to a symbol index threshold (Block 660). As noted above in connection with block 630, the symbol index threshold and the examples disclosed herein is seven, corresponding to the number of symbols included in the watermark. However, in some examples, different symbol index thresholds may be used, corresponding to different numbers of symbols included in the watermark. If the symbol index is not greater than or equal to the symbol index threshold (Block 660 returns a result of NO), the example symbol buffer analyzer 242 increments the symbol index. (Block 662). The operations of blocks 655, 660, and 662 are repeated until all symbols which make up the watermark have been analyzed.

If the symbol index is greater than or equal to the symbol index threshold (Block 660 returns a result of YES), the example symbol buffer analyzer 242 determines whether all of the symbol indices return a valid value. (Block 665). In some examples, despite a best effort to identify the most likely value, no value may be identified. No value may be identified when, for example, no watermark is being transmitted, a noisy environment causes the value of the symbol to be indecipherable, etc. If one or more of the symbol indices do not return a valid value (Block 665 returns a result of NO), control proceeds to block 602, where the buffer position is reinitialized and the symbol collection of block 644 continues.

If all symbol indices return a valid value (Block 665 returns a result of YES), the example watermark constructor 246 concatenates the symbol values to form a complete watermark. (Block 670). The example watermark constructor 246 then provides the watermark to the audience measurement data controller 250 such that the watermark can be recorded in the data store 255. (Block 675). Control then proceeds to block 602, where the buffer position is reinitialized, and the symbol collection of block 644 continues.

FIG. 7 is a flowchart representative of example machine-readable instructions 700 that may be executed to implement the example meter 114 of FIGS. 1 and/or 2 to transmit media monitoring information to the example central facility 190 of FIG. 1. The example program 700 of FIG. 7 begins at block 710 when the audience measurement data controller 250 determines whether a data storage threshold has been exceeded (Block 710). In the illustrated example, the threshold is a time limit specifying that monitoring data is transmitted once per day. Additionally or alternatively, any other periodic and/or aperiodic approach to transmitting monitoring information from the meter 114 may be used. For example, the data threshold might be based on an amount of monitoring information stored in the data store 255.

If the threshold has not been exceeded (Block 710 returns a result of NO) the audience measurement data controller 250 continues to determine whether the monitoring data threshold has been exceeded. When the monitoring data threshold has been exceeded (Block 710 returns a result of YES), the audience measurement data controller 250 transmits, via the network communicator 260, the stored monitoring information to the central facility 190. In the illustrated example, the network communicator 260 transmits the stored monitoring information via gateway 140 and the network 180. However, in some examples, the network communicator 260 transmits the stored network communications via a local connection such as, for example, a serial connection, a universal serial bus (USB) connection, a Bluetooth connection, etc. When the network communicator 260 transmits via the local connection, the network meter 114 may be physically moved to a location of the central facility 190 by, for example, physically mailing the meter 114, etc.

FIG. 8 is an example data table 800 representing symbol data that may be stored in the example symbol buffer 238 of FIG. 2. In the illustrated example of FIG. 8, the data table 800 includes seven columns 810, 820, 830, 840, 850, 860, 870 corresponding to the number of symbols within the watermark 300. For example, the first column 810 corresponds to the first symbol 310 of the watermark 300 of FIG. 3, the second column 820 corresponds to the second symbol 310 of the watermark 300, the third column 830 corresponds to the third symbol 330 of the watermark 300, the fourth column 840 corresponds to the fourth symbol 340 of the watermark 300, the fifth column 850 corresponds to the fifth symbol 350 of the watermark 300, the sixth column 860 corresponds to the sixth symbol 360 of the watermark 300, and the seventh column 870 corresponds to the seventh symbol 370 of the watermark 300. In the illustrated example of FIG. 8, the data table 800 includes six rows corresponding to buffer positions within the symbol buffer 238. In the illustrated example of FIG. 8, the first row 801 corresponds to the first buffer position, the second row 802 corresponds to the second buffer position, the third row 803 corresponds to the third buffer position, the fourth row 804 corresponds to the fourth buffer position, the fifth row 805 corresponds to the fifth buffer position, and 806 corresponds to the sixth buffer position. In the illustrated example of FIG. 8, seven columns corresponding to seven symbols, and six rows corresponding to six buffer positions are used. However, any other number of rows, columns, symbols, and/or buffer positions may additionally or alternatively be used. Moreover, while in the illustrated example symbols correspond to columns, and buffer positions correspond to rows, the data table 800 may be organized in any other fashion.

Each example cell of the data table 800 includes data corresponding to the symbol value and the signal-to-noise ratio stored by the symbol decoder 234 of FIG. 2 for the particular symbol occurrences corresponding to that cell. In the illustrated example of FIG. 8, symbol values are shown in a hexadecimal format. As described above in connection with FIG. 5, each symbol of the examples disclosed herein includes seven bits of information. As a result, there are 128 possible values for each symbol. In a hexadecimal format, the values "0x00" through "0x7F" are used to represent the 128 possible values. However, any other data format may additionally or alternatively be used such as, for example, a binary format, a decimal format, and ASCII format, etc.

In the illustrated example of FIG. 8, the signal-to-noise ratios are represented using decibel (dB) values. A larger decibel value (e.g., 15 dB or greater) indicates that the symbol was strong as compared to other noise identified went attempting to detect the symbol. In contrast, a lower decibel value (e.g., less than 15 dB) indicates that the symbol was weak compared to other noise identified when attempting to detect the symbol. For example, the example data table 800 of the illustrated example of FIG. 8 indicates that a symbol value of "0x5D" having a signal-to-noise ratio of 6 dB is stored in a cell identified by the second column 820 (corresponding to the second symbol 320) and the second row 802 (corresponding to the second buffer position).

Figure 9:
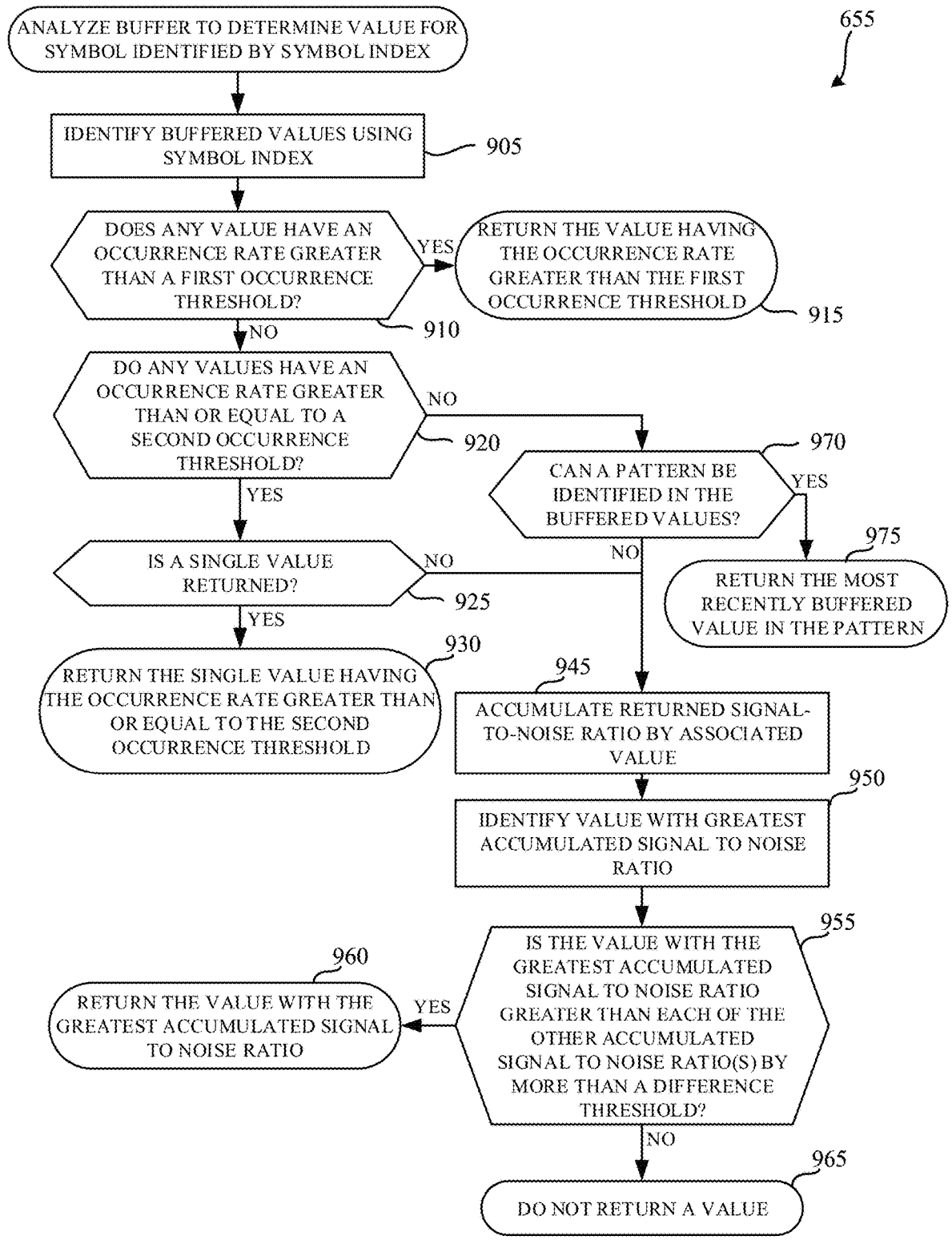
FIG. 9 is a flowchart representative of example machine-readable instructions that may be executed to implement the example meter of FIGS. 1 and/or 2 to analyze the symbol buffer for identification of the most likely symbol.

FIG. 9 is a flowchart representative of example machine-readable instructions 655 that may be executed to implement the example meter 114 of FIGS. 1 and/or 2 to analyze the symbol buffer 238 for identification of the most likely symbol value for a given symbol. The example program 655 of the illustrated example of FIG. 9 begins when the symbol buffer analyzer 242 is to analyze the symbol buffer 238 to determine the most likely value for the symbol identified by the symbol index maintained in connection with block 646 of the illustrated example of FIG. 6.

The example symbol buffer analyzer 242 begins by identifying the buffered symbol values stored in the symbol buffer 238 for the symbol index. (Block 905). For example, if the symbol index to be analyzed were one, the example symbol buffer analyzer 242 would identify the buffered values stored in the first example column 810 of the example data table 800 of FIG. 8. The example symbol buffer analyzer 242 determines whether any of the buffered values have an occurrence rate greater than a first occurrence threshold. (Block 910). In the illustrated example of FIG. 9, the first occurrence threshold requires that the symbol value have an occurrence rate greater than 50% (e.g., the symbol value represents a majority of the symbol values contained in the buffer for the given symbol index, corresponding to four or more matching values). If any value has an occurrence rate greater than the first occurrence threshold (Block 910 returns a result of YES), the example symbol buffer analyzer 242 returns the value having the occurrence rate greater than the first occurrence threshold. (Block 915). The process of FIG. 9 is then completed, but may be repeated in accordance with the procedures described in connection with FIG. 6.

In connection with the illustrated example of FIG. 8, in the first symbol column 810, the value "08" appears four times (e.g., an occurrence rate greater than 50% of the time). As a result, the value "08" will be selected and returned by the symbol buffer analyzer 242 because the value "08" has the occurrence rate greater than the first occurrence threshold (e.g., Block 910 will return a result of YES). Likewise, in the example data table 800 of FIG. 8, column 850 (corresponding to the fifth symbol) indicates that the value "03" has an occurrence rate greater than the first occurrence threshold. The value "03" will be returned by the example process of FIG. 9 (e.g., because Block 910 will return a result of YES).

If the symbol buffer analyzer 242 determines that no symbol value for the symbol index has an occurrence rate greater than the first occurrence threshold (e.g., Block 910 returns a result of NO), the example symbol buffer analyzer 242 determines whether any symbol values have an occurrence rate greater than or equal to a second occurrence threshold. (Block 920). In examples disclosed herein, the second occurrence threshold is 40% (corresponding to two or more matching values). However, any other second occurrence threshold may additionally or alternatively be used. In examples disclosed herein, because the second occurrence threshold does not require that the symbol represent a majority of the symbol values, it is possible that multiple symbol values may have an occurrence rate that meets the second occurrence threshold. If the symbol buffer analyzer 242 determines that any symbol values for the symbol index have an occurrence rate greater than or equal to the second occurrence threshold (Block 920 returns a result of YES), the symbol buffer analyzer 242 determines whether just a single symbol value is returned. (Block 925). If a single symbol value is returned, the example symbol buffer analyzer 242 returns the single symbol value having the occurrence rate greater than or equal to the second occurrence threshold as the symbol value for the current symbol index. (Block 930.) The process of FIG. 9 is then completed, but may be repeated in accordance with the procedures described in connection with FIG. 6.

In connection with the illustrated example of FIG. 8, in the second symbol column 820, the value "6D" does not have an occurrence rate greater than the first occurrence threshold (e.g., 50%), but does have an occurrence rate greater than or equal to the second occurrence threshold (e.g., 40%). Consequently, while the value "6D" does not appear a majority of the time, no other values match it in the number of occurrences. Because no other value also meets the second occurrence threshold (Block 920 returns a result of YES, and Block 925 returns a result of YES), the example symbol buffer analyzer 242 returns the value "6D". (Block 930). Likewise, in the fourth symbol column 840 of the illustrated example of FIG. 8, the value "2F" does not meet the first occurrence threshold (Block 910 returns a result of NO), but does meet the second occurrence threshold (Block 920 returns a result of YES), and only a single value (e.g., "2F") meets the second occurrence threshold (Block 925 returns a result of YES), such that the symbol buffer analyzer 242 will return the value "2F". (Block 930).

In contrast to the example second column 820 the illustrated example of FIG. 8, the third example column 830 of the illustrated example of FIG. 8 includes two values (e.g., the value "45" and the value "46") that meet the second occurrence threshold (Block 920 returns a result of YES, but Block 925 returns a result of NO). In such a scenario, arbitration is required to select the most likely value. In the illustrated example of FIG. 9, the symbol buffer analyzer 242 accumulates (e.g., sums) the signal-to-noise ratios associated with each value. (Block 945). In the illustrated example of FIG. 10, accumulated (or summed) symbol to noise ratios by value are shown on a symbol-by-symbol basis. The example symbol buffer analyzer 242 identifies the value with the greatest accumulated signal-to-noise ratio. (Block 950). The symbol buffer analyzer 242 then determines whether the symbol value with the greatest accumulated signal-to-noise ratio has an accumulated signal-to-noise ratio greater than the other accumulated signal-to-noise ratios by more than a difference threshold. (Block 955). In examples disclosed herein, the difference threshold is 6 dB. However, any other difference threshold may additionally or alternatively be used.

When, for a given symbol index, two different symbol values appear with an occurrence rate greater than or equal to the second occurrence threshold (Block 920 returns a result of YES, but block 925 returns a result of NO), and have accumulated signal-to-noise ratios that are not different by more than a threshold (Block 955 returns a result of NO), the symbol buffer analyzer 242 does not return a symbol value for the given symbol index. (Block 965). The process of FIG. 9 is then completed, but may be repeated in accordance with the procedures described in connection with FIG. 6. In examples disclosed herein, no symbol value is returned because it is not possible to distinguish between the stored symbol values for the given symbol index with reasonable certainty. In some examples, further analysis may additionally be performed to attempt to identify the most likely symbol value such as, for example, performing the procedure of FIG. 9 using additional buffer positions. For example, the most recent four buffer positions may initially be used but, upon block 955 returning a result of NO, the process of FIG. 9 may be performed using increasing amounts of buffer positions (e.g., five, six, etc.).

In contrast, when two different symbol values appeared with an occurrence rate greater than or equal to the second occurrence threshold for a given symbol index (Block 920 returns a result of YES, but block 925 returns a result of NO), but the accumulated signal-to-noise ratio of one symbol value is greater than the accumulated signal-to-noise ratio(s) of the other symbol values (Block 955 returns a result of YES), it is possible to distinguish between the potential symbol values such that the symbol value with the greatest accumulated signal-to-noise ratio can be returned by the symbol buffer analyzer 242 for the given symbol index. (Block 960). The process of FIG. 9 is then completed, but may be repeated in accordance with the procedures described in connection with FIG. 6.

Returning to block 920, in some examples, the symbol buffer analyzer 242 may determine that no symbol values have an occurrence rate greater than or equal to the second occurrence threshold for a given symbol index. (Block 920 may return result of NO). In such an example, the example symbol buffer analyzer 242 analyzes the buffered symbol values to determine whether a pattern of symbol values can be identified. (Block 970). For example, the seventh symbol is expected to include a minutes and/or seconds portion of a time stamp. Because, for example, each watermark is to be transmitted approximately every two seconds, it is expected that the seventh symbol will be incremented by two upon each successive watermark. As a result, in the illustrated example of FIG. 8, the seventh column 870 includes data that increments by a value of two in each buffer position. In block 970 of FIG. 9, a pattern of values incrementing by two is used. However, any other pattern may additionally or alternatively be used. If the symbol buffer analyzer 242 identifies that a pattern can be identified in the buffered values (Block 970 returns a result of YES), the symbol buffer analyzer 242 returns the most recently buffered value in the pattern. (Block 975). For example, in the illustrated example of FIG. 8, the value "0x0B" is returned because, for example, the sixth row 806 was the most recent buffer position to be populated. However, any other approach to selecting a symbol value within the pattern to be returned for a given symbol index may additionally or alternatively be used. For example, the value "0x09" corresponding to the fifth row 805 may be returned because it has the strongest signal-to-noise ratio.

In some examples, the example symbol buffer analyzer 242 may determine that no symbol values have an occurrence rate greater than or equal to the second occurrence threshold for a given symbol index (Block 920 returns a result of NO), and no pattern may be identified in the buffered values (Block 970 also returns a result of NO). In such an example, control proceeds to block 945 where signal-to-noise ratios are accumulated by their associated value. In connection with the illustrated example of FIG. 8, the sixth column 860 corresponding to the sixth symbol does not include a value having an occurrence rate greater than or equal to the second occurrence threshold, and no pattern can be identified. The signal-to-noise ratios of the sixth symbol are accumulated by their associated value (Block 945), and the symbol value with the greatest accumulated signal-to-noise ratio is selected (Block 950), assuming that the accumulated signal-to-noise ratio of that value is greater than each of the other accumulated signal-to-noise ratios by more than the difference threshold (Block 955 returns a result of YES). In the illustrated example of FIG. 8, the value "0x12" is returned for the sixth symbol because the value "0x12" corresponds to the highest signal-to-noise ratio as identified in (Block 950), and this signal-to-noise ratio (e.g., 44 dB) is greater that each of the other accumulated signal-to-noise ratios (e.g., 16 dB corresponding to a value of "0x11", 15 dB corresponding to a value of "0x1A") by more than the difference threshold (e.g., 6 dB). The process of FIG. 9 is then completed, but may be repeated in accordance with the procedures described in connection with FIG. 6.

FIG. 10 is an example data table 1000 representing accumulated signal to noise ratio values that may be used to perform signal to noise ratio arbitration for selection of the most likely symbol. In the illustrated example of FIG. 10, seven columns 1010, 1020, 1030, 1040, 1050, 1060, 1070 corresponding to the seven symbols 310, 320, 330, 340, 350, 360, 370 of the watermark 300 are shown. The example data table 1000 of the illustrated example of FIG. 10 includes rows 1090 corresponding to each of the values included in the example data table 800 FIG. 8. Each of the cells of the example data table 1000 of FIG. 10 correspond to the accumulated signal-to-noise ratio identified in connection with block 945 of FIG. 9. For example, in connection with the sixth symbol, an accumulated signal-to-noise ratio of 44 dB for the value "12" is shown in the example data table 1000 of FIG. 10.

While in the illustrated example of FIG. 10 only rows corresponding to values present in the example data table 800 FIG. 8 are shown, in practice, a row corresponding to each of the 128 possible values for symbol may be used. Moreover, while in the illustrated example of FIG. 10, columns 1010, 1020, 1030, 1040, 1050, 1060, 1070 corresponding to each of the symbols 310, 320, 330, 340, 350, 360, 370 are shown, each column may be calculated only upon the need for the accumulated signal-to-noise ratio(s) for that symbol. That is, not all symbols will require execution of block 945 for identification of the most likely symbol value. For example, the fifth symbol, which returned a value of "0x03" in each of the buffer positions, would not require calculation of the accumulated signal-to-noise ratio.

Figure 11:
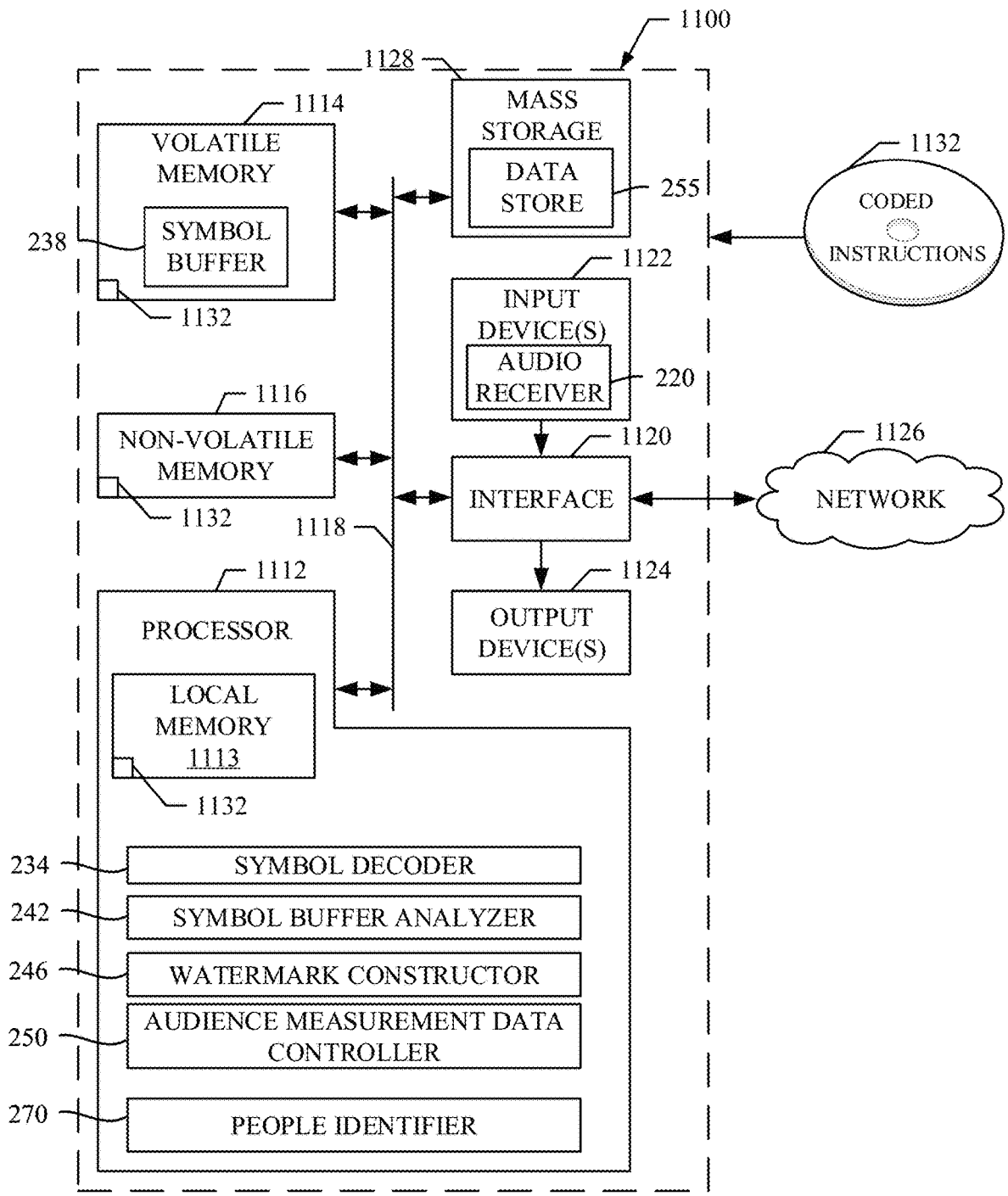
FIG. 11 is a block diagram of an example processor platform capable of executing the machine-readable instructions of FIGS. 6, 7, and/or 9 to perform symbol-based watermark detection.

FIG. 11 is a block diagram of an example processor platform 1100 capable of executing the instructions of FIGS. 6, 7, and/or 9 to implement the meter 114 of FIGS. 1 and/or 2. The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The example processor 1112 executes instructions to implement the example symbol decoder 234, the example symbol buffer analyzer 242, the example watermark constructor 246, the example audience measurement data controller 250, and/or the example people identifier 270. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. In the illustrated example of FIG. 11, the volatile memory 1114 stores the symbol buffer 238. However, any other memory device of the example processor platform 1100 may additionally or alternatively store the example symbol buffer 238. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 11, the example input device(s) 1122 implement the example audio receiver 220.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 6, 7, and/or 9 may be stored in the mass storage device 1128, in the volatile memory 1114, in the non-volatile memory 1116, and/or on a removable tangible computer readable storage medium such as a CD or DVD. In the illustrated example of FIG. 11, the example mass storage device 1128 stores the data store 255. However, any other memory device of the example processor platform 1100 may additionally or alternatively store the example data store 255.

From the foregoing, it will be appreciated that the above disclosed methods, apparatus, and articles of manufacture facilitate symbol-based watermark detection. The example approaches disclosed herein enable watermark detection that is more resilient to detection errors. For example, whereas in prior watermark detection systems, an entire watermark would be discarded if any portion of the watermark was not conclusively identified, the infrequently changing nature of symbols within the watermark can be used to more reliably determine a value for each symbol. More reliable detection of symbols and, more generically, watermarks, ensures that media monitoring data is not lost and/or missing. Lost and/or missing media monitoring data is troublesome because it can compromise the integrity of media exposure metrics determined based on the media monitoring data. Ensuring that watermarks are more reliably identified by performing symbol-based analysis reduces the amount of post-processing (e.g., interpolation between watermarks to supplement missing watermarks) that must be performed when generating media presentation metrics.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   memory; and
   processor circuitry to execute machine readable instructions to at least:
      determine a first rate of occurrence of a first potential symbol value within a history of potential symbol values corresponding to a first symbol within a watermark;
      determine a second rate of occurrence of a second potential symbol value within the history of potential symbol values corresponding to the first symbol within the watermark;
      select one of the first potential symbol value or the second potential symbol value with a larger rate of occurrence as a likely symbol value for the first symbol;
      in response to a determination that the first rate of occurrence of the first potential symbol value equals the second rate of occurrence of the second potential symbol value:
         determine a first accumulated signal to noise ratio value corresponding to occurrences of the first potential symbol value;
         determine a second accumulated signal to noise ratio value corresponding to occurrences of the second potential symbol value; and
         select one of the first potential symbol value or the second potential symbol value with a larger accumulated signal to noise ratio value as the likely symbol value for the first symbol; and
      concatenate the likely symbol value with a second likely symbol value corresponding to a second symbol within the watermark to detect the watermark.

2. The apparatus of claim 1, wherein the processor circuitry is to populate a symbol buffer with the history of potential symbol values corresponding to the first symbol.

3. The apparatus of claim 2, wherein the processor circuitry is to populate the symbol buffer with signal to noise ratio values corresponding to each of the potential symbol values.

4. The apparatus of claim 2, wherein the symbol buffer is to store six values of history of each symbol of the watermark.

5. The apparatus of claim 1, wherein the processor circuitry is to:
   determine that at least one of the first rate of occurrence or the second rate of occurrence does not meet an occurrence threshold; and
   in response to the determination that the at least one of the first rate of occurrence or the second rate of occurrence does not meet the occurrence threshold:
      determine whether a pattern is identifiable in the history of potential symbol values, and
      select one of the history of potential symbol values as the likely symbol value when the pattern is identifiable.

6. The apparatus of claim 5, wherein the pattern is an incrementing value corresponding to incrementing timestamps within data conveyed by the watermark.

7. The apparatus of claim 5, wherein the selected one of the history of potential symbol values is a most recently identified symbol value that matches the pattern.

8. The apparatus of claim 1, wherein the processor circuitry is to:
   determine that the first accumulated signal to noise ratio value is greater than the second accumulated signal to noise ratio value by more than a signal to noise difference threshold; and
   select the first potential symbol value in response to the determination that the first accumulated signal to noise ratio value is greater than the second accumulated signal to noise ratio value by more than the signal to noise difference threshold.

9. An apparatus comprising:
   means for determining a first rate of occurrence of a first potential symbol value within a history of potential symbol values corresponding to a first symbol within a watermark, the means for determining to determine a second rate of occurrence of a second potential symbol value within the history of potential symbol values corresponding to the first symbol within the watermark;
   first means for selecting one of the first potential symbol value or the second potential symbol value with a larger rate of occurrence as a likely symbol value for the first symbol;
   means for calculating, in response to a determination that the first rate of occurrence of the first potential symbol value equals the second rate of occurrence of the second potential symbol value, a first accumulated signal to noise ratio value corresponding to occurrences of the first potential symbol value, the means for calculating to determine a second accumulated signal to noise ratio value corresponding to occurrences of the second potential symbol value;
   second means for selecting one of the first potential symbol value or the second potential symbol value with a larger accumulated signal to noise ratio value as the likely symbol value for the first symbol; and
   means for concatenating the likely symbol value with a second likely symbol value corresponding to a second symbol of the watermark to detect the watermark.

10. The apparatus of claim 9, further including means for populating a symbol buffer with the history of potential symbol values corresponding to the first symbol.

11. The apparatus of claim 10, wherein the means for populating is to populate the symbol buffer with signal to noise ratio values corresponding to each of the potential symbol values.

12. The apparatus of claim 10, wherein the symbol buffer is to store six values of history of each symbol of the watermark.

13. An apparatus comprising:
   memory; and
   processor circuitry to execute machine readable instructions to at least:

determine a first count of occurrences of a first potential symbol value within a history of potential symbol values corresponding to a first symbol within a watermark;

determine a second count of occurrences of a second potential symbol value within the history of potential symbol values corresponding to the first symbol within the watermark;

in response to a comparison of the first count of occurrences and the second count of occurrences:

determine a first accumulated signal to noise ratio value corresponding to occurrences of the first potential symbol value;

determine a second accumulated signal to noise ratio value corresponding to occurrences of the second potential symbol value; and select one of the first potential symbol value or the second potential symbol value having a greatest accumulated signal to noise ratio value as a likely symbol value for the first symbol; and concatenate the likely symbol value for the first symbol with a second likely symbol value corresponding to a second symbol the watermark to detect the watermark.

14. The apparatus of claim 13, wherein the processor circuitry is to populate a symbol buffer with the history of potential symbol values corresponding to the first symbol.

15. The apparatus of claim 14, wherein the processor circuitry is to populate the symbol buffer with signal to noise ratio values corresponding to each of the potential symbol values.

16. The apparatus of claim 14, wherein the symbol buffer is to store six values of history of each symbol of the watermark.

17. The apparatus of claim 13, wherein the processor circuitry is to, in response to a determination that (i) the first count of occurrences equals the second count of occurrences, (ii) the first count of occurrences satisfies an occurrence threshold, and (iii) the second count of occurrences satisfies the occurrences threshold:

determine whether a pattern is identifiable in the history of potential symbol values corresponding to the first symbol; and select one of the history of potential symbol values as the likely symbol value when the pattern is identifiable.

18. The apparatus of claim 17, wherein the pattern is an incrementing value corresponding to incrementing timestamps within data conveyed by the watermark.

19. The apparatus of claim 13, wherein the processor circuitry is to:

determine that the first accumulated signal to noise ratio value is greater than the second accumulated signal to noise ratio value by at least a threshold amount; and select the first potential symbol in response to the determination that the first accumulated signal to noise ratio value is greater than the second accumulated signal to noise ratio value by at least the threshold amount.

20. An apparatus comprising:

first means for determining a first count of occurrences of a first potential symbol value within a history of potential symbol values corresponding to a first symbol within a watermark, the means for determining to determine a second count of occurrences of a second potential symbol value within the history of potential symbol values corresponding to the first symbol within the watermark;

second means for determining to, in response to a comparison of the first count of occurrences and the second count of occurrences, determine a first accumulated signal to noise ratio value corresponding to occurrences of the first potential symbol value, and determine a second accumulated signal to noise ratio value corresponding to occurrences of the second potential symbol value;

means for selecting one of the first potential symbol value or the second potential symbol value with a larger accumulated signal to noise ratio value as a likely symbol value for the first symbol; and means for concatenating the likely symbol value for the first symbol with a second likely symbol value corresponding to a second symbol of the watermark to detect the watermark.

* * * * *